United States Patent
Shirakawa

(10) Patent No.: US 11,135,776 B2
(45) Date of Patent: Oct. 5, 2021

(54) MANAGEMENT SYSTEM, MANAGEMENT SERVER, CONTROL METHOD, AND PROGRAM

(71) Applicant: CANON KABUSHIKI KAISHA, Tokyo (JP)

(72) Inventor: Yuki Shirakawa, Mitaka (JP)

(73) Assignee: Canon Kabushiki Kaisha, Tokyo (JP)

( * ) Notice: Subject to any disclaimer, the term of this patent is extended or adjusted under 35 U.S.C. 154(b) by 148 days.

(21) Appl. No.: 15/762,858

(22) PCT Filed: Sep. 5, 2016

(86) PCT No.: PCT/JP2016/004032
§ 371 (c)(1),
(2) Date: Mar. 23, 2018

(87) PCT Pub. No.: WO2017/056397
PCT Pub. Date: Apr. 6, 2017

(65) Prior Publication Data
US 2018/0236716 A1    Aug. 23, 2018

(30) Foreign Application Priority Data
Sep. 28, 2015   (JP) .............................. JP2015-190465

(51) Int. Cl.
*B29C 64/393* (2017.01)
*B33Y 50/02* (2015.01)
*G05B 19/4099* (2006.01)
*B33Y 50/00* (2015.01)
(Continued)

(52) U.S. Cl.
CPC ............ *B29C 64/393* (2017.08); *B29C 67/00* (2013.01); *B33Y 50/00* (2014.12); *B33Y 50/02* (2014.12);
(Continued)

(58) Field of Classification Search
CPC ..... B29C 64/393; B29C 67/00; B29C 64/118; B33Y 50/00; B33Y 50/02; G05B 19/4099;
(Continued)

(56) References Cited

U.S. PATENT DOCUMENTS

2004/0006405 A1* 1/2004 Chen ..................... B33Y 50/02
700/119
2006/0127153 A1* 6/2006 Menchik .................. B41J 2/175
400/62
(Continued)

FOREIGN PATENT DOCUMENTS

CN       1550970 A     12/2004
JP   2000309147 A     11/2000
(Continued)

*Primary Examiner* — Charles R Kasenge
(74) *Attorney, Agent, or Firm* — Canon U.S.A., Inc. IP Division

(57) ABSTRACT

A management system at least has a management server configured to manage information regarding a control device configured to execute a job for molding, by using a material, a three-dimensional object including an object corresponding to three-dimensional model data to be molded. The management system generates execution history of a job including a result of molding received from the control device and a control command used for the molding, collects the generated execution history of the job, and totalize a used amount (or usage) of a material used for molding the molded object including the object based on the collected execution history. The management system totalizes usages of the material used for a non-object for execution of the job.

23 Claims, 11 Drawing Sheets

(51) Int. Cl.
*B29C 67/00* (2017.01)
*B29C 64/118* (2017.01)

(52) U.S. Cl.
CPC ........ *G05B 19/4099* (2013.01); *B29C 64/118* (2017.08); *G05B 2219/35134* (2013.01); *G05B 2219/49007* (2013.01)

(58) Field of Classification Search
CPC ........... G05B 2219/35134; G05B 2219/49007; G06F 11/34; B22F 3/1055; B41J 2/175; B65H 63/084
See application file for complete search history.

(56) References Cited

U.S. PATENT DOCUMENTS

| | | | |
|---|---|---|---|
| 2007/0127069 A1* | 6/2007 | Steele | G06F 3/1226 358/1.16 |
| 2010/0080572 A1* | 4/2010 | Tsuzuki | G03G 15/5075 399/10 |
| 2010/0161102 A1* | 6/2010 | Mattes | B22F 3/1055 700/108 |
| 2015/0027239 A1* | 1/2015 | Konkle | B29C 64/118 73/862.627 |
| 2016/0318255 A1* | 11/2016 | Ou | B29C 64/386 |
| 2016/0328808 A1* | 11/2016 | Willis | G06F 16/9535 |

FOREIGN PATENT DOCUMENTS

| | | |
|---|---|---|
| JP | 2001-334580 A | 12/2001 |
| JP | 2005-219343 A | 8/2005 |
| JP | 2013-67018 A | 4/2013 |
| JP | 2014106823 A | 6/2014 |
| JP | 2015035123 A | 2/2015 |
| JP | 2015-202625 A | 11/2015 |

* cited by examiner

FIG. 5B

511
```
G21 ; set units to millimeters
M107
M104 S200 ; set temperature
G28 ; home all axes
G1 Z5 F5000 ; lift nozzle
M109 S200 ; wait for temperature to be reached
G90 ; use absolute coordinates
G92 E0
M82 ; use absolute distances for extrusion
G1 F1800.000 E-1.00000
G92 E0
```

512
```
M107
M104 S0 ; turn off temperature
G28 X0 ; home X axis
M84 ; disable motors
```

513
```
G1 Z0.350 F7800.000
G1 X-18.975 Y0.000 F7800.000
G1 E1.00000 F1800.000
G1 X-18.975 Y-17.750 E1.57750 F1080.000
G1 X-18.578 Y-20.015 E1.65230
G1 X-17.435 Y-22.009 E1.72710
G1 X-15.681 Y-23.495 E1.80190
G1 X-13.526 Y-24.297 E1.87670
G1 X-12.318 Y-24.407 E1.91616
G1 X127.682 Y-24.407 E6.47109
G1 X129.946 Y-24.010 E6.54589
G1 X131.941 Y-22.866 E6.62069 F1080.000
G1 X133.065 Y-21.666 E6.67420
G1 X217.085 Y93.834 E11.32111
G1 X218.096 Y95.899 E11.39591
G1 X218.359 Y97.750 E11.45674
G1 X218.359 Y217.750 E15.36097
G1 X217.962 Y220.015 E15.43577
G1 X216.818 Y222.009 E15.51057
G1 X215.064 Y223.495 E15.58537
G1 X212.909 Y224.297 E15.66017
G1 X211.702 Y224.407 E15.69963
G1 X211.157 Y224.407 E15.71734
G1 X208.101 Y223.664 E15.81968
G1 X-15.375 Y108.164 E24.00418
G1 X-17.204 Y106.772 E24.07898
G1 X-18.451 Y104.840 E24.15378
G1 X-18.975 Y102.250 E24.23975
G1 X-18.975 Y0.075 E27.56404
G1 F1800.000 E26.56404
G92 E0
...
```

514
```
G1 Z0.550 F7800.000
G1 X211.552 Y98.000 F7800.000
G1 E1.00000 F1800.000
G1 X211.552 Y217.500 E2.69058 F1260.000
G1 X210.907 Y217.500 E2.69970
M106 S255
G1 X210.652 Y217.500 E2.70680 F3600.000
G1 X210.652 Y98.000 E6.02624
G1 X210.907 Y98.000 E6.03334
M107
G1 X211.477 Y98.000 E6.04140 F1260.000
G1 X211.340 Y98.250 F7800.000
G1 X211.102 Y98.250 F7800.000
G1 X211.102 Y217.250 E7.06379 F1200.000
G1 F1800.000 E6.06379
G92 E0
...
```

FIG. 8A
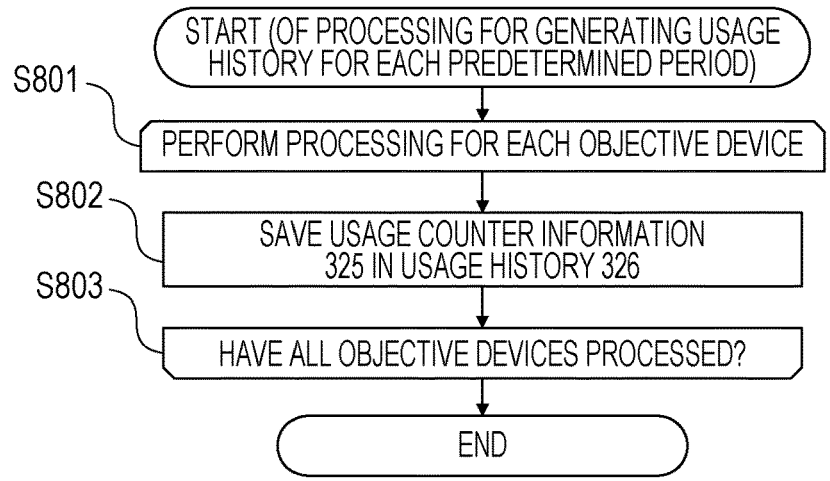
FIG. 8B
FIG. 8C
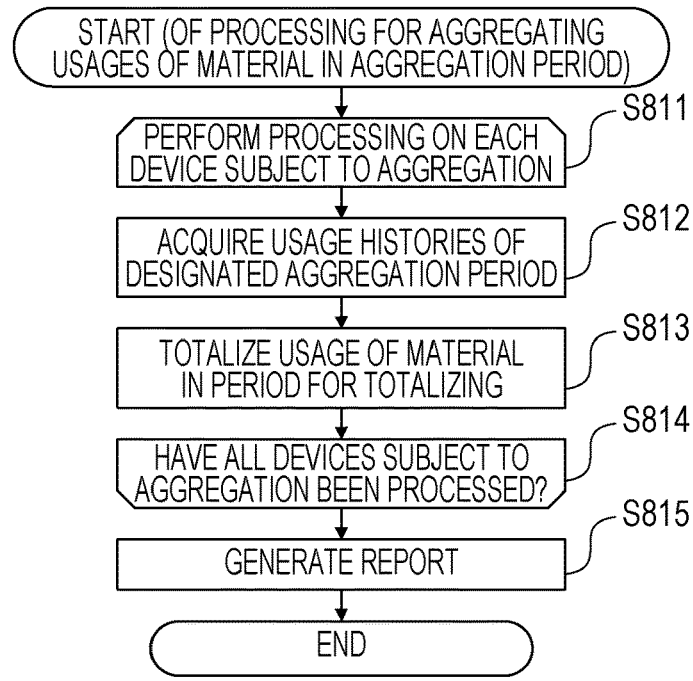

MANAGEMENT SYSTEM, MANAGEMENT SERVER, CONTROL METHOD, AND PROGRAM

TECHNICAL FIELD

The present invention relates to a management system which manages information regarding a control device configured to mold a three-dimensional object, a management server, a control method, and a program.

BACKGROUND ART

In recent years, three-dimensional (or 3D) printers have rapidly and widely spread. A 3D (or three-dimensional) printer is a general term of a control device configured to mold a three-dimensional object based on special model data. A technology relating to three-dimensional molding is also called Additive Manufacturing. On the other hand, a two-dimensional (2D) printer is a printer configured to perform printing on, for example, paper (or sheet) two-dimensionally.

3D printers have existed from before but have been used only in some types of industry such as a manufacturing industry because such a 3D printer may take much space for its large size, is difficult to handle, or is expensive, for example. Because of the technological innovations in recent years, more 3D printers of types which are easy to handle, inexpensive, and small, such as FDM (Fused Deposition Modeling), have emerged rapidly and are widely used by general consumers. The technological innovations in recent years have contributed to development of various molding methods, and advanced functionality and performance of 3D printers have been used by an increased number of businesses for the purposes of manufacturing prototypes and product parts.

Many types of material are available for molding in 3D printers. The type of material depends on the applied molding method. Materials usable for molding in a 3D printer may include not only a material usable for an object but also a material usable for a support molded as required as a supporting member for molding processing. In molding using a material that is special powder such as plaster and an adhesive, the adhesive used for molding is also included in the material.

On the other hand, in fields relating to conventional two-dimensional (or 2D) printers, various applications are available for managing and employing a printer. An MPS (Managed Print Service) is a service usable for managing a 2D printer properly and reducing the total cost associated with printing works. The service includes a service which reports a status of use such as the number of printed sheets, a rate of aggregation, a rate of double-sided printing, and a rate of color printing in a 2D printer. Counter information such as the number of printed sheets may be collected from a 2D printer, and the numbers may be totalized based on the information. Then, a report regarding the status of use may be generated for visualization so that a printing method and apparatus arrangement suitable for a customer can be proposed.

PTL 1 discloses a print control device which decrypts a control command transmitted to a printing apparatus and calculates an amount of a material such as toner and ink to be used before execution of printing.

Providing MPS as described above in a 3D printer may require acquirement of an amount of a material to be used for molding in the 3D printer to generate a report regarding a status of use of the 3D printer.

Some shape of an object to be molded and some molding methods may require a support for an object being molded for reasons of gravity. In such a case, a 3D printer may mold a required support in addition to an object. Therefore, when molding an object requiring a support, a material may be used not only for molding the object represented by 3D model data but also for molding the support. The support may be removed after the molded object completes.

A 3D printer which uses many materials of different colors and types differently in accordance with a given purpose may not have a specific usage counter (for the number of black-and-white printed sheets or the number of color printed sheets, for example) as in a 2D printer. Because of that, counts of a usage counter for a material may not be acquired easily.

PTL 1 does not disclose a specific scheme for calculating the amount of a material used in a 2D printer from a control command. Therefore, the technology disclosed in PTL 1 may not be used easily for generating a report regarding the status of use of a material in a 3D printer.

The amounts of materials used in a 3D printer may be required to be calculated by purpose for totalization. For example, when a molded object including a support is generated, a report regarding amounts of materials to be used may be required to be displayed.

CITATION LIST

Patent Literature

PTL 1: Japanese Patent Laid-Open No. 2005-219343

SUMMARY OF INVENTION

Technical Problem

Accordingly, the present invention provides a system capable of grasping and managing amounts of materials to be used by purpose in a control device for a 3D printer, for example, or components included in the system.

The present invention provides a management system at least having a management server configured to manage information regarding a control device configured to execute a job for molding, by using a material, a three-dimensional object including an object corresponding to three-dimensional model data to be molded, the system including a generating unit configured to generate execution history of a job including a result of molding received from the control device and a control command used for the molding, a collecting unit configured to collect the execution history of the job generated by the generating unit, and a totalizing unit configured to totalize a used amount (or usage) of a material used for molding the molded object including the object based on the execution history collected by the collecting unit, wherein the totalizing unit totalizes usages of the material used for a non-object for execution of the job.

Further features of the present invention will become apparent from the following description of exemplary embodiments with reference to the attached drawings.

BRIEF DESCRIPTION OF DRAWINGS

FIG. 5B illustrates an exemplary control command generated by molding control software.

FIG. 8A is a flowchart showing a flow of processing for generating usage history for each predetermined time period.

FIG. 8B illustrates an exemplary usage history.

FIG. 8C is a flowchart illustrating a flow of processing for totalizing usages of materials in a predetermined time period.

DESCRIPTION OF EMBODIMENTS

Embodiments of the present invention will be described below with reference to drawings.

First Exemplary Embodiment

Figure 1:
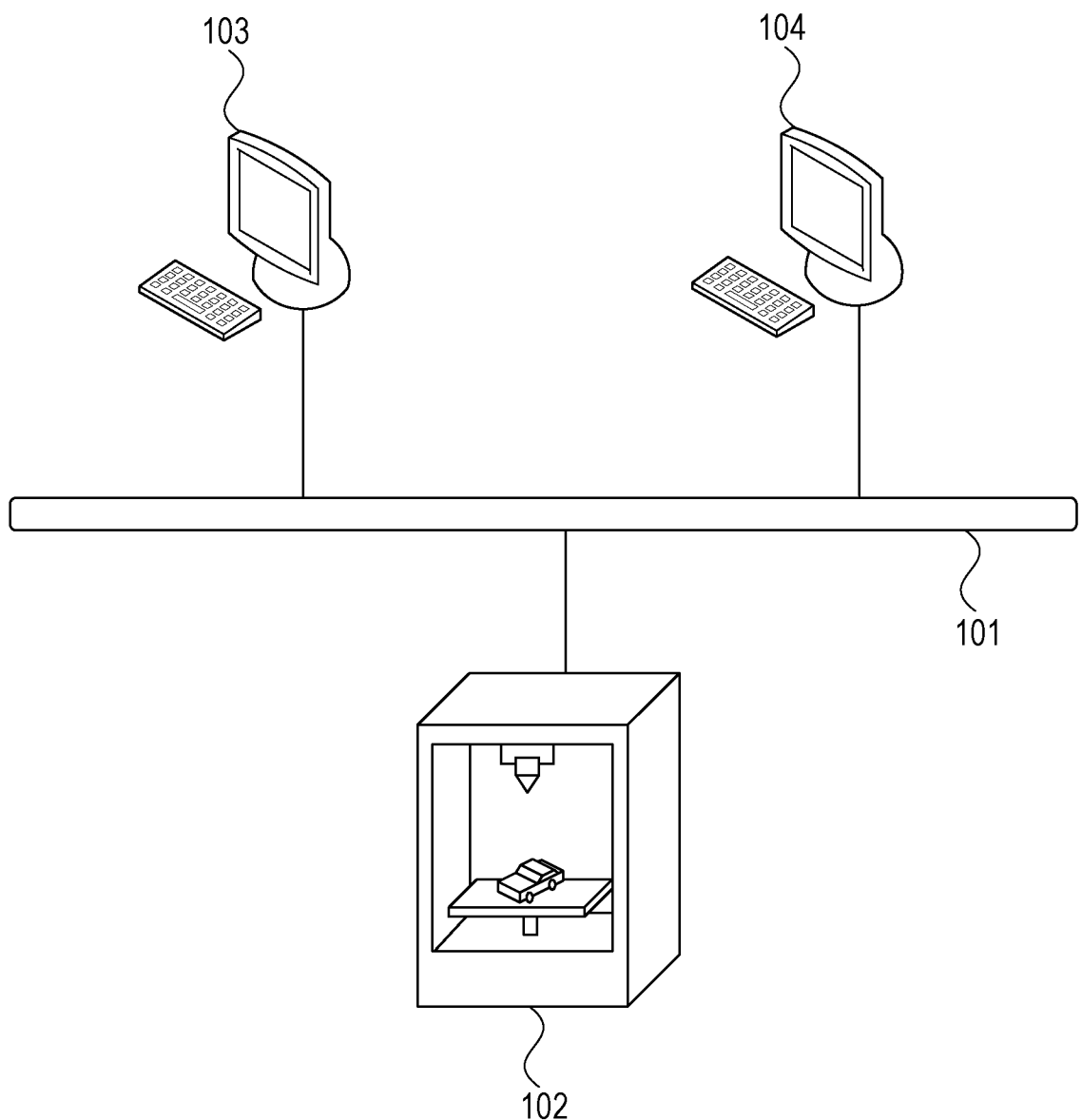
FIG. 1 illustrates an exemplary system configuration and an exemplary network configuration according to an exemplary embodiment of the present invention.

FIG. 1 illustrates an exemplary system configuration and an exemplary network configuration according to an exemplary embodiment of the present invention.

A network 101 may be an intranet or a local area network (hereinafter, called a LAN). A 3D printer 102 is an example of a control device configured to mold a three-dimensional object based on special model data. A computer 103 is a client computer in which molding control software is installed. A computer 104 is a management server on which a 3D-printer management application runs. Computers 103 and 104 may be a computer (PC), a tablet computer, a smart phone or the like.

The 3D printer 102 and the computers 103 and 104 included in a management system according to this exemplary embodiment are capable of transmitting and receiving information to and from each other over the network 101. The network 101 may be a wireless network such as a wireless LAN. Alternatively, the network 101 may be any public network such as the Internet if it is capable of transmitting and receiving information.

Figure 2:
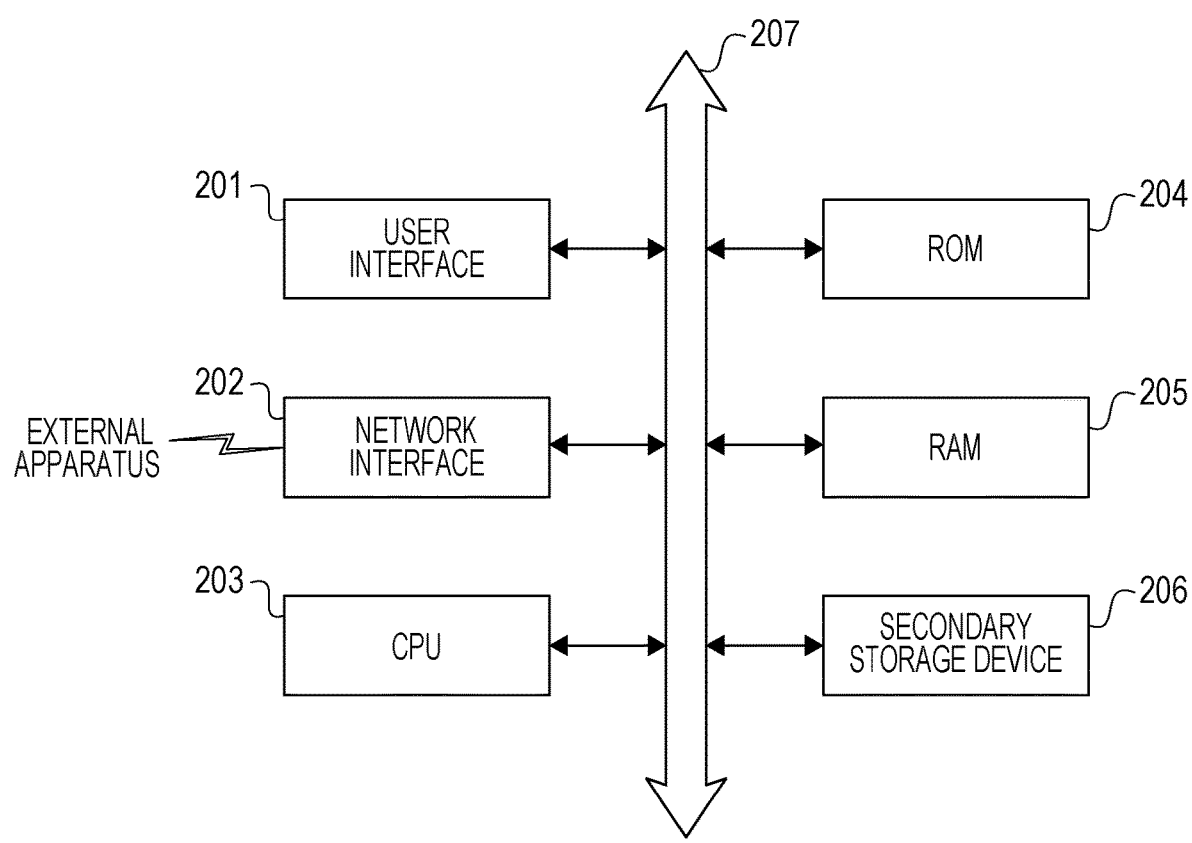
FIG. 2 illustrates an exemplary hardware configuration of an information processing function.

FIG. 2 illustrates an exemplary hardware configuration of information processing functions of the 3D printer 102 and the computers 103 and 104. In the 3D printer 102, the configuration of an embedded computer 312 illustrated in FIG. 3, which will be described below, corresponds to the hardware of information processing function illustrated in FIG. 2.

A user interface (hereinafter, called a UI) 201 is configured to input/output information and a signal through a display, a keyboard, a mouse, a touch panel, a button or the like. A computer which does not have such hardware may be connected to and be operated by another computer through a remote desktop or a remote shell.

A network interface 202 is connected to a network such as a LAN and configured to communicate with another computer and a network apparatus. A ROM 204 stores an embedded program and data. A RAM 205 is a temporary memory area. A secondary storage device 206 may be an HDD or a flash memory. A CPU 203 is configured to execute a program read out from the ROM 204, the RAM 205, and the secondary storage device 206. The components 201 to 206 as described above are connected through an input/output interface 207.

The 3D printer 102 includes a hardware component dependent on the applied molding method. The hardware component dependent on the applied molding method may be an engine unit in the 3D printer 102 more specifically. The engine unit has a storage device such as a CPU, a ROM, and a RAM as well as hardware dependent on the molding method controlled by the CPU. For Fused Deposition Modeling (FDM), for example, the hardware may include a print head or stage, a heater configured to heat nozzles of the print head, a fan configured for cooling, and a motor. The motor is provided in the 3D printer for driving the print head in X, Y, Z-axes directions. Other molding methods are also applicable such as Stereo lithography (STL), Selective Laser Sintering (SLS), and an ink-jet method.

Figure 3:
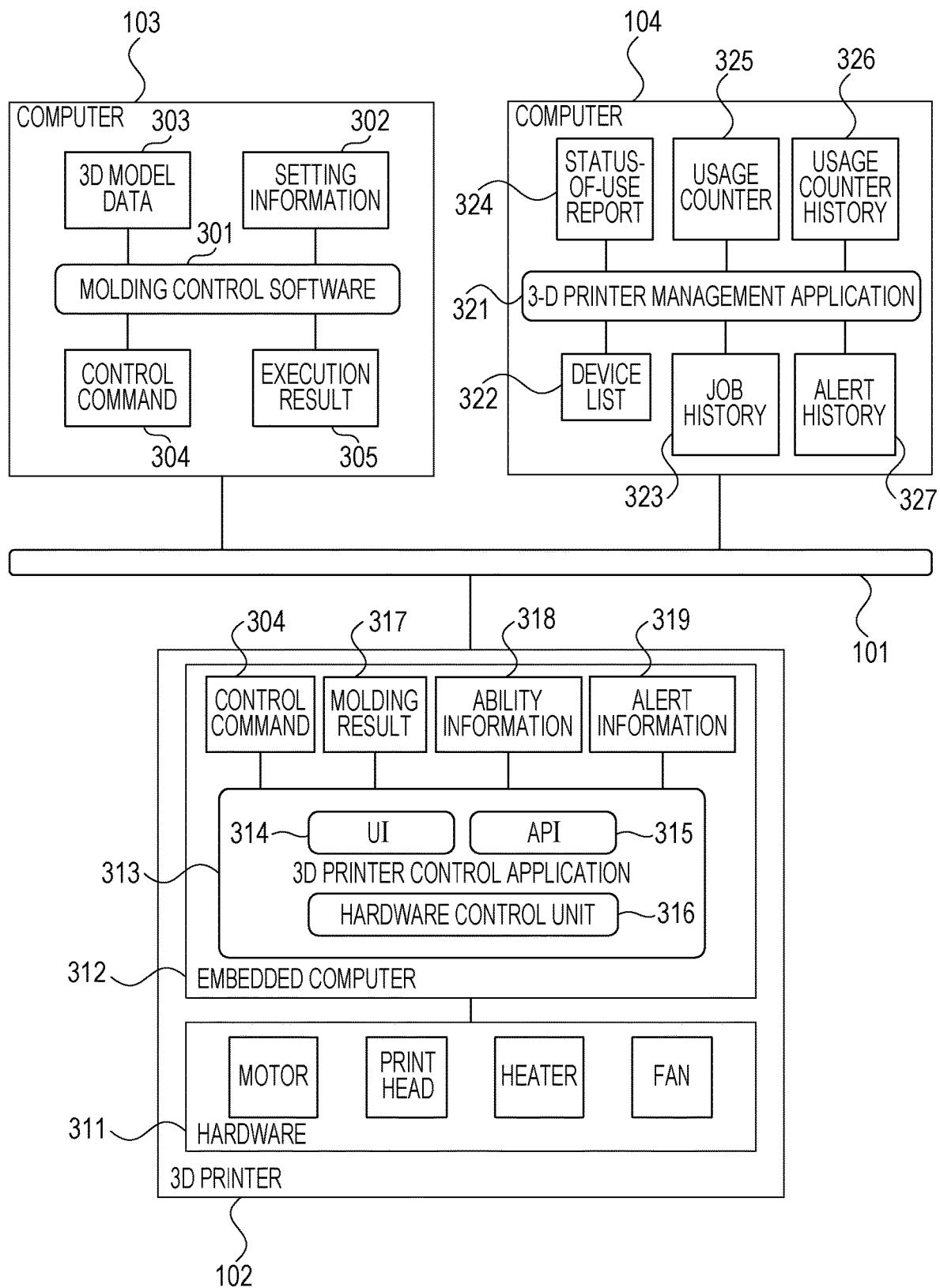
FIG. 3 illustrates an exemplary software and hardware configurations of this system.

FIG. 3 illustrates a software configuration (partially including a hardware configuration) of this system.

First of all, a configuration of the computer 103 will be described.

Molding control software 301 is software program installed to be executed by the computer 103. The molding control software 301 may include a function, called a slicer, for generating an output setting and a control command relating to molding.

Setting information 302 is information including setting items and set values relating to molding to be performed by the molding control software 301. The setting items relating to molding may include a model name of a 3D printer to be used, a speed and temperature of a print head thereof, a type and color of a material to be used, and a filling pattern, for example.

3D model data 303 is three-dimensional model data representing an object to be molded by using a three-dimensional shape. For example, STereo Lithography (STL) is one of file formats usable for saving data representing a three-dimensional shape.

A control command 304 is a control command for the 3D printer generated by the molding control software 301 based on the 3D model data 303 and applies a format called G-code, for example, which is a command which has been used for a machine tool and is extended for a 3D printer. The molding control software 301 may generate not only a control command relating to molding an object that is a mold part represented by 3D model data but also a control command relating to molding of a support (or support structures) necessary for molding. An STL file does not include information relating to molding of a support. When an STL file is converted to G-code, information relating to molding of a support is added.

An execution result 305 is data acquired by processing by using the molding control software 301 a molding result 317, which will be described below, transmitted from the 3D printer 102. For example, the molding result 317 having a log format is converted to a format that is easy to handle by the molding control software 301.

The molding control software 301 generates a job history including the setting information 302 and control command 304 to be transmitted to the computer 104. The function for generating a job history and a function for transmitting the job history to the computer 104 may be added in a format such as a plug-in program to general molding control software. Alternatively, another application (or a program, not illustrated) having the function for generating a job history and the function for transmitting a job history to the computer 104 may be installed in the computer 103 to implement those functions. The application may generate a job history by collect information regarding a job from the molding control software 301 and information regarding an execution result from the 3D printer 102.

Next, a configuration of the 3D printer 102 will be described.

Hardware 311 is an engine unit in the 3D printer 102. Hardware components in the 3D printer vary in accordance with the molding method to be applied. For Fused Deposition Modeling (FDM), for example, the hardware 311 includes a print head or stage, a motor configured to drive the print head in X, Y, and Z-axis directions, a heater configured to heat nozzles of the print head, a fan configured for cooling.

An embedded computer 312 is a computer embedded in the 3D printer 102. The embedded computer 312 can be manufactured at lower costs because it is specified to necessary functions and does not have unnecessary functions, performances and parts, compared with general-purpose computers. However, in order to satisfy some requirements for functions and performances in the 3D printer, the embedded computer 312 may be a general-purpose computer.

A 3D printer control application 313 is an application to be executed on the embedded computer 312. The 3D printer control application 313 includes a user interface (UI) 314, an Application Programming Interface (API) 315, and a hardware control unit 316.

The UI 314 may be a combination of a display device configured to display several lines of text only if it is an inexpensive display and hardware operating buttons or may be a display device having a touch panel. In accordance with the content of the display on the UI 314, the UI 314 may be operated by checking the state of the 3D printer to instruct a desired process to the 3D printer.

The API 315 is configured to transmit and receive a command and data to and from the external computers 103 and 104. Through the API 315, a command may be transmitted from the external computer 103 or 104 to the 3D printer control application 313 to control the 3D printer 102.

In accordance with a command received through the UI 314 or API 315 or a command issued by the 3D printer control application 313, the hardware control unit 316 operates the components of the hardware 311 to execute output of a molded object or pre-processing and post-processing of output.

The control command 304 generated by the molding control software 301 may be transmitted to the 3D printer control application 313 through the network 101 and API 315. The control command 304 generated by the computer 103 may be transmitted to the 3D printer control application 313 through the computer 104. In a case where the 3D printer 102 does not have a network interface, for example, the control command 304 may be transmitted to the 3D printer control application 313 through a storage device such as a USB memory.

In accordance with an output command from the UI 314 or API 315, the 3D printer control application 313 interprets the control command 304, and the hardware control unit 316 operates the components of the hardware 311 to output a molded object.

The molding result 317 is information held in the 3D printer 102, such as a report on an output process in progress of a molded object, an output final result such as a success or a failure, a start or an end of a job, or aborted or restarted time. The molding control software 301 acquires the molding result 317 to check the molding result of the 3D printer in the computer 103.

Ability information 318 is information describing an ability of the 3D printer 102. The ability information 318 is based on the molding method applied in the 3D printer 102 and includes definitions relating to ranges of the speed and temperature of the print head, the type of a material, the thickness of a layer, a molding capacity supported by the 3D printer 102. Alert information 319 is information describing alerts in the 3D printer. The alert information 319 holds alert information regarding the 3D printer such as print head clogged, cooling fan disabled, empty material, and laser disabled.

Next, a configuration of the computer 104 will be described.

A 3D-printer management application 321 is an application to be executed on the computer 104. A device list 322 is data describing a list of devices to be managed by the 3D-printer management application 321.

A job history 323 is a job execution history including the molding result 317 acquired from the 3D printer 102 and the setting information 302, control command 304, and execution result 305 acquired from the computer 103. Based on the setting information 302 and control command 304 included in the job history 323, the computer 104 can calculate and totalize the amount of a material used (or usage of material). An example of calculation of a usage of a material will be described with reference to FIG. 6.

A status-of-use report 324 is a report to be displayed and be output by the 3D-printer management application 321.

Usage counter information 325 contains numerical usages of materials in the 3D printer by individual 3D printer and by material type. The individual 3D printer will simply be called a device hereinafter otherwise specified.

A usage history 326 includes a history recording a material usage for each job executed in the 3D printer and a history recording the usage counter information 325 for each time period set by the 3D-printer management application 321.

The 3D-printer management application 321 acquires a unique ID for each device from the 3D printer 102 so that acquired data can be identified and be totalized for each device even when a plurality of devices of an identical model are to be managed. The 3D-printer management application 321 acquires data at all times or periodically from the 3D printer 102 and the computer 103 to be managed to update the job history 323, the alert history 327, and the device list 322.

It should be noted that the aforementioned software configuration can be implemented irrespective of the hardware configuration and arrangement of the 3D printer and computers according to this exemplary embodiment. In other words, the software components may be executed on any hardware of the embedded computer 312 and the computers 103 and 104. All of the software components may be executed on one hardware apparatus, or a necessary software component may be executed on a plurality of hardware apparatuses.

Figure 4:
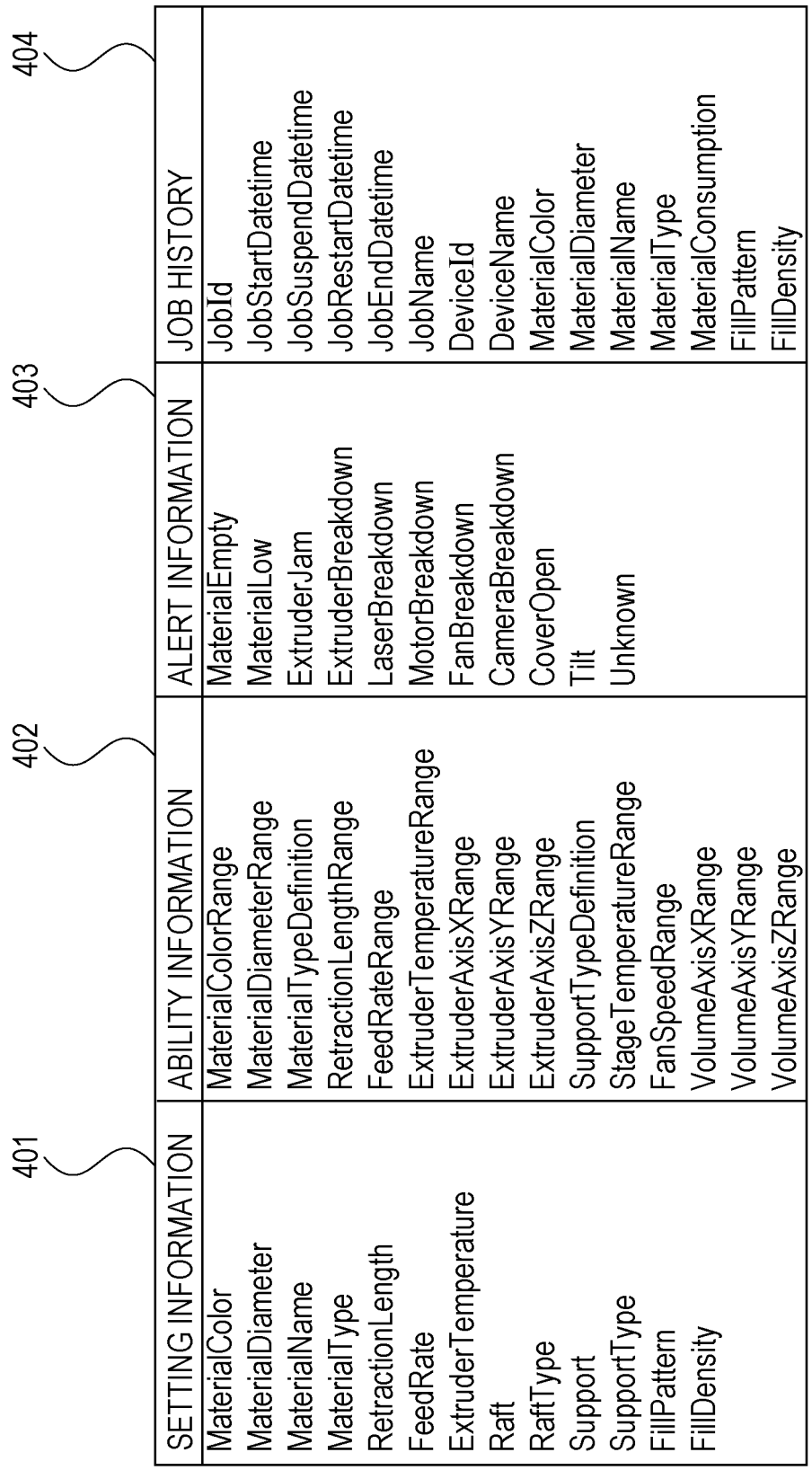
FIG. 4 illustrates exemplary data used in this system.

FIG. 4 illustrates exemplary data used in this system. The data illustrated in FIG. 4 are example attributes included in the setting information 302, ability information 318, alert information 319, and job history 323.

Setting information 401 is setting information regarding molding to be set by the molding control software 301. The setting information 401 may include attributes such as a color and a type of material, a moving speed and temperature of an extruder, use of a support member, a type of support member if it is used, use of a filling pattern, and a type of filling pattern if it is used.

Ability information 402 can be acquired when the ability information 318 can be acquired from the 3D printer 102. The ability information 402 may include attributes such as a color and a type of material usable in the 3D printer, an operable range of the print head in X, Y, Z-axis directions, a range of speed of rotation of the fan.

Alert information 403 can be acquired when the alert information 319 can be acquired from the 3D printer 102. The alert information 403 may include attributes such as empty material, extruder clogged, fan disabled, and protection cover open.

A job history 404 can be included in the job history 323. The job history 404 may include, for example, an identification ID of a job, time and date information, an identification ID and a name of a used device, a name and a type of a used material, and a filling pattern. It should be noted that names and types of used materials may be defined in an array structure in consideration of a case where a plurality of print heads are provided.

The attributes and alerts illustrated in FIG. 4 are given for illustration purpose only, and the attribute to be actually used are not limited to the attributes illustrated in FIG. 4.

Figure 5A:
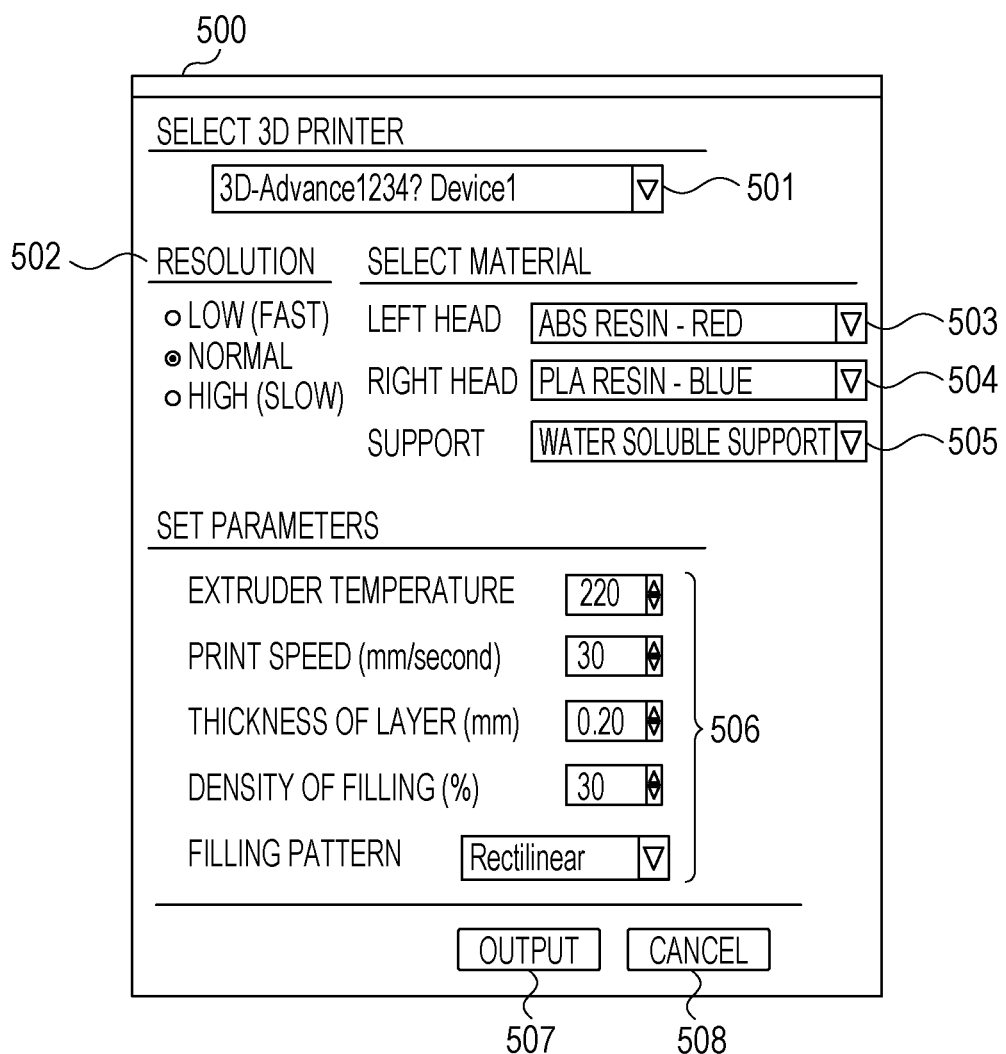
FIG. 5A illustrates an exemplary setting screen relating to molding.

FIG. 5A illustrates an exemplary setting screen 500 relating to molding provided by the molding control software 301.

Settings relating to mold can be defined for a 3D printer selected through a drop-down box 501. A radio button 502 is usable for selecting an output profile for resolution. A profile customized by a user may also be read.

Drop-down boxes 503 and 504 are usable for selecting types of material to be used in print heads. When the ability of the 3D printer selected through the drop-down box 501 is available, materials available in the 3D printer may be provided as a drop-down list for selection based on attributes described in the ability information 402 in FIG. 4, for example. When the ability of the 3D printer selected through the drop-down box 501 is not acquired, one of material candidates prepared by the molding control software is selected. Here, a type of material such as ABS, PLA, nylon, and PET may be selected. A water-soluble specified material may be selected as a support. Having described examples of materials relating to FDM molding, different materials may be used for other molding methods. For example, materials relating to an ink-jet molding may include photo-curing resin and wax. Materials relating to SLS molding may include powder of nylon or metal. Materials relating to optical molding may include a special photo-curing resin. Some 3D printers may perform molding by using special powder of plaster, for example, and an adhesive.

The technology according to this exemplary embodiment enables to report usage (or used amount) of a material in FDM molding. The present invention enables to report usages (used amount) of various materials (such as a material or an adhesive) used for molding in a 3D printer by a proper unit such as length, weight, and volume. Such a report is assumed to provide usages by type and color of a material, for example.

A drop-down list 505 is usable for selecting the presence/absence of a support and the type of material to be used for molding the support if any. In a case where the materials selected through the drop-down boxes 503 and 504 are also to be used for a support, "LEFT HEAD" OR "RIGHT HEAD", for example, may be selected through the drop-down box 505. Such a support may be made of a water-soluble material, as illustrated in FIG. 5A, or a material that can be peeled by hand which are used as materials specific to a support. In a case where a plurality of materials cannot be used in one job because the device has one head, on the other hand, a material used for molding an object corresponding to 3D model data may sometimes be used for molding a support. For easy distinction between such two types of support, a material specific to molding of a support is called a support-specific material in the description of this exemplary embodiment.

Settings 506 are defined for parameters of items. Based on the values of the settings 506, the control command 304 is generated. In a case where the ability of the 3D printer selected through the drop-down box 501 can be acquired, the range of the set values are supported by the 3D printer based on the attributes illustrated in the ability information 402, for example. In a case where the ability of the 3D printer selected through the drop-down box 501 cannot be acquired on the other hand, the range of the set values is defined by the molding control software. When a button 507 is pressed down, a job is generated based on the values of the setting items on the setting screen 500. The generated job may include the setting information 302 and the control command 304. When a button 508 is pressed down, the setting operation relating to molding ends, and the setting screen 500 is closed.

The setting screen 500 is given for illustration purpose, and examples of the user interface are not limited to the setting screen 500. For example, having described that the setting screen 500 is a user interface by which a plurality of materials can be selected, one drop-down list may be provided for selecting a material in a case where the 3D printer has a single head, as described above. The setting items within the setting screen 500 may vary in accordance with the model of the 3D printer and may also vary in accordance with the molding control software for 3D printers of one model. Therefore, the setting items to be set are not limited to the examples on the setting screen 500 either.

FIG. 5B illustrates control commands relating to FDM molding, which are exemplary control commands generated by the molding control software 301. The 3D printer 102 executes the control commands 304 in order from the beginning to output a 3D object. The control command 304 includes a beginning part 511, an end part 512, and commands 513 and 514 for molding of a certain layer.

The beginning part 511 executes initial settings for the temperature of a print head and for position adjustment in the example in FIG. 5B. The end part 512 executes ending settings for returning the cooling setting and the position setting for the print head to the default settings.

A command group 513 actually outputs a material. A command "G1" moves a print head where "X", "Y", and "Z" are coordinates defined on the 3D printer, "F" is a feed rate (moving speed of the print head), and "E" is a length of a material to be pushed out from the print head. The length of a material pushed out from a print head here corresponds to a length of a filament-shaped material before output from the print head. For example, "G1 X-18.975 Y-17.750 E1.57750 F1080.000" is described on the fourth row of the command 513. This command indicates a movement of a print head to coordinates (18.975, 17.750) at a speed of velocity of 1080.000 mm/minute where the length of the filament to be pushed out is equal to 1.57750 mm. These commands may be executed in order, and sliced two-dimensional objects are deposited in the Z axis direction so that a three-dimensional object can be generated.

The letter "E" of each row of the command indicates a total length of a material to be pushed out continuously before the command of the row. With a command "G92 E0", the length to be pushed out is reset to zero (0). This indicates that the filament will be pushed out to an isolated patch next. "E" values immediately preceding to a reset may be added to acquire the length of the material used for molding. A length of a material, a cross section of the material (filament in FIG. 5B), and a density of the material may be used to calculate the weight of the material used for molding.

The used amount (or usage) of a material used for molding may not be calculated by the aforementioned method. After the layer in the command group 513 is molded, the next layer is molded by the command group 514. The beginning commands of the command groups are different in the Z-axis direction, and the difference corresponds to the thickness (layer height) of the layer. The thickness of the layer may vary because it is settable by a user as described with reference to the setting screen in FIG. 5A. In the example with the command groups 513 and 514, the layer height is equal to 0.2 mm. The layer height, the stroke of the print head during a material outputting operation, and the density of the material may be used to acquire the weight of the material used for molding. According to method, the weight of the material used for molding can be calculated without using the "E" value included in the control commands.

Figure 6:
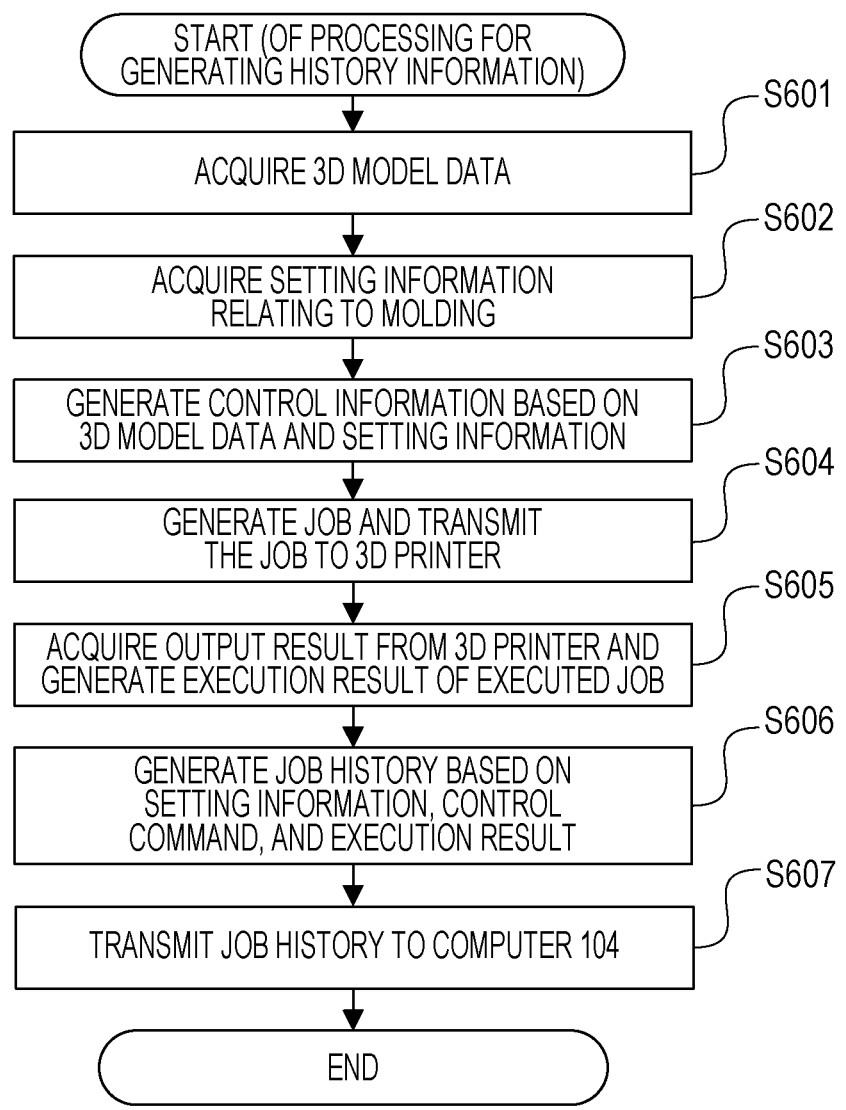
FIG. 6 is a flowchart illustrating a flow of processing for generating history information.

FIG. 6 is a flowchart illustrating a flow of processing in the computer 103 for generating history information (such as the job history 323) to be transmitted to the computer 104. This processing is mainly executed by a function module configured to generate a job to be implemented by execution of the molding control software 301, generate history information, and transmit the history information.

In S601, 3D model data 303 saved in memory are acquired.

In S602, the setting information 302 relating to molding input through an interface provided by the molding control software 301 is acquired.

In S603, based on the 3D model data 303 acquired in S601 and the setting information 302 acquired in S602, the control command 304 is generated.

In S604, a job for instructing molding to the 3D printer 102 is generated. The job may include the setting information 302 and the control command 304. After that, the generated job is transmitted from the computer 103 to the 3D printer 102. The generated job may be transmitted to the 3D printer 102 through the computer 104 or another computer, not illustrated.

In S605, in the computer 103, the transmitted molding result 317 of the job is acquired from the 3D printer 102, and the execution result 305 is generated based on the data in the molding result 317.

In S606, based on the setting information 302, the control command 304, and the execution result 305, a job history 323 is generated as history information.

In S607, the job history generate in S606 is transmitted to the computer 104 on which the 3D-printer management application 321 runs.

The 3D printer 102 may execute the processing for generating a job history 323. In this case, the job history 323 is stored in the 3D printer 102, and the computer 104 collects the job history 323 from the 3D printer 102. In a case where a job is transmitted from the computer 103 to the 3D printer 102 through the computer 104, the computer 104 may generate a job history. Thus, the processing for generating a job history may be executed by one of the computers or by the 3D printer.

Figure 7A:
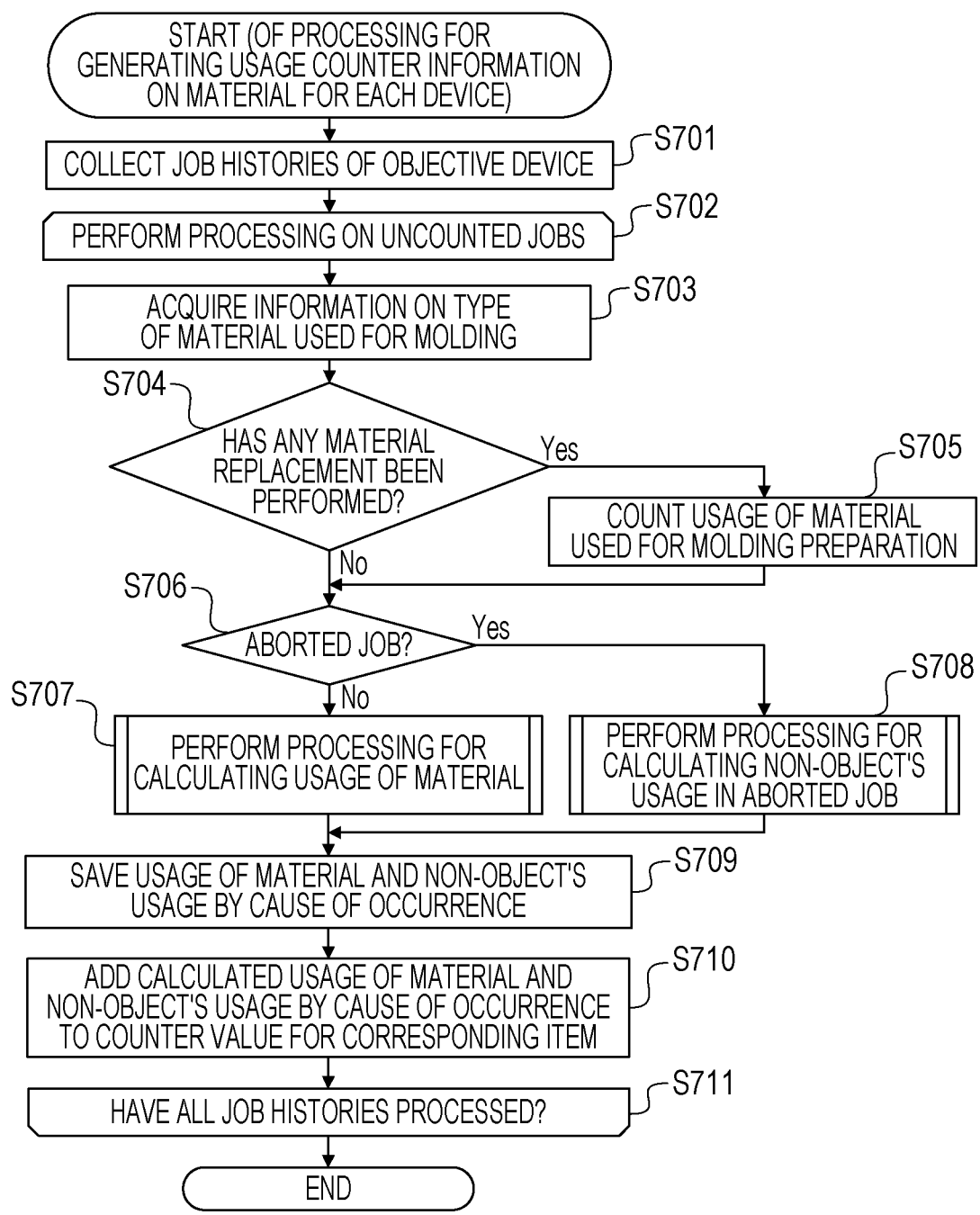
FIG. 7A is a flowchart illustrating a flow of processing for generating a material usage counter for each device.
Figure 7B:
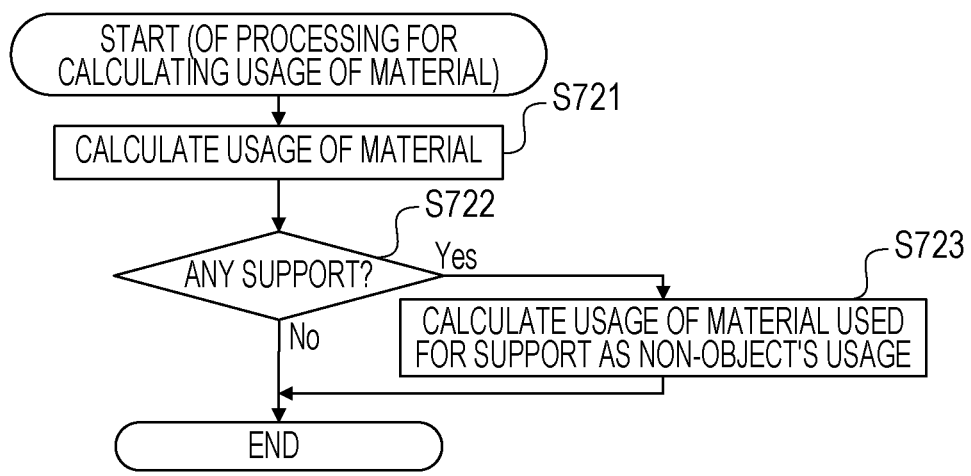
FIG. 7B is a flowchart illustrating a flow of processing for calculating a material usage.
Figure 7C:
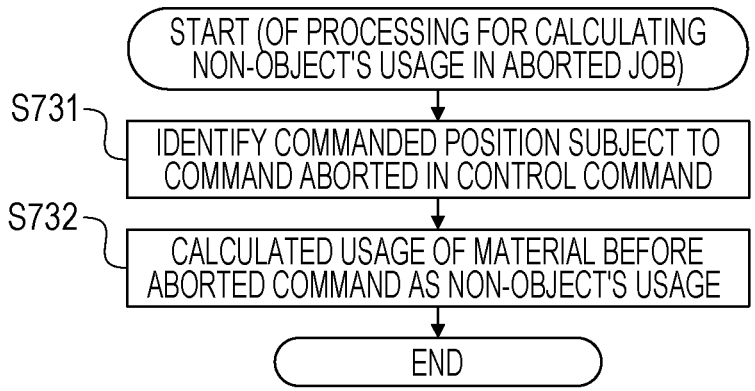
FIG. 7C is a flowchart illustrating a flow of processing for calculating non-object's usage for an aborted job.

FIGS. 7A to 7C are flowcharts illustrating a flow of processing for generating the usage counter information 325 regarding a material by device in the computer 104. This processing is executed by the 3D-printer management application 321 (hereinafter, called a management application 321).

Processing for generating a material usage counter for each device as illustrated in FIG. 7A will be described.

In S701, the management application 321 collects the job history 323 of a device to be managed. The management application 321 saves the collected job history 323 in the ROM 204 or the secondary storage device 206 within the computer 104.

The processing from S702 to S711 is repeated on records of the job history 323 for which a material usage is not counted of a device to be totalized. The management application 321 may add a flag to the job history 323 saved in S701 in order to determine whether a usage has been counted for each of job historical records.

In S703, the management application 321 acquires information regarding the type of material used based on setting information contained in the job history 323. One or a plurality of types of material may be used. In a case where a control command contains information regarding the type or types of material, the management application 321 may acquire the information regarding the type or types of material from the control command.

In S704, the management application 321 determines whether material replacement has occurred during a period from the previous job execution to this job execution based on the job history 323. For example, if the material used in the previous job and the material used in this job are different in the job history 323, the management application 321 determines that the material has been replaced. In a case where the fact that a material replacement event has occurred is recorded as log information relating to the 3D printer, the management application 321 may determine the occurrence of material replacement with reference to the data recorded in the log information. If occurrence of material replacement is determined, the management application 321 advances the processing to S705. If not, the management application 321 advances the processing to S706 without execution of the processing in S705.

In S705, the management application 321 counts a usage of a material used for molding preparation. For example, the management application 321 calculates a usage of a material output for cleaning a print head for the material replacement as a non-object's usage. The non-object's usage of a material consumed for cleaning may be a value acquired from the ability information 318 or may be a value preset by a user in the management application 321. The management application 321 may calculate as a non-object's usage a material usage output for molding preparation before a job start not in response to occurrence of material replacement.

A material usage for molding preparation that is not a usage of a material used for an object corresponding to 3D model data but is a usage of a material for executing a job is called a non-object's usage in the description of this exemplary embodiment. The non-object's usage may be a usage of a material for a support, molding preparation, or an aborted job.

In S706, the management application 321 determines whether the current job is a job aborted during molding processing based on the job history 323. If the current job is not aborted job, the management application 321 advances the processing to S707. If the job is an aborted job, the management application 321 advances the processing to S708.

In S707, the management application 321 performs processing for calculating a material usage. The processing for calculating a material usage will be described with reference to FIG. 7B.

In S708, the management application 321 performs processing for calculating a non-object's usage for an aborted job. The processing for calculating a usage of a material used for a molded object in the job aborted during the molding processing will be described with reference to FIG. 7C.

In S709, the management application 321 saves the material usage calculated in S707 and the non-object's usage calculated in S708 are saved for each job. Here, the management application 321 the non-object's usage by reason. The material usage for each job calculated in S709 is held in the usage history 326. Saving data of material usages by job allows display of a material usage for each job as a report, which will be described below with reference to FIG. 9.

In S710, the management application 321 adds the calculated material usage to a counter value for the item corresponding to the type of material in the usage counter information 325. If the corresponding item does not exist, the management application 321 may generate a new item as a new material type and record the calculated usage therein. The management application 321 records the calculated material usage used in the one job in the usage history 326. If the material usage saved and added in S709 and S710 is no longer necessary, the management application 321 may discard the control command 304 included in the job history 323 for which the usage counting processing has completed.

If the management application 321 in S711 determines that the update of the counter information 325 based on the material usage relating to all records of the job history 323 has completed, the processing of the flowchart ends. If some unprocessed record remains in the job history 323, the processing returns to S702.

In a case where the computer 103 is capable of executing processing for calculating the usage of a material as will be described below with reference to FIG. 7B and FIG. 7C, the management application 321 may collect calculated usages of a material in S701. In this case, the processing in S702 to S711 may be omitted.

Next, processing for calculating a usage of a material as illustrated in FIG. 7B will be described. This processing is to be executed in S707.

In S721, the management application 321 calculates a usage of a material used for molding an intended 3D object. As described above, the management application 321 calculates a usage of a material by decrypting a control command. In a case where a plurality of materials are used, the material usages are calculated for each type of material used.

In S722, the management application 321 determines whether a support member is used or not. The management application 321 may determine whether a support member is used in this job or not based on whether use of a support member is set at the drop-down box 505 on the setting screen 500 or not, for example.

In S723, the management application 321 calculates a usage of a material used for the support. Because the support is not a part forming the object itself, the usage therefor is calculated as a non-object's usage in this exemplary embodiment.

The management application 321 can determine whether the material used for the support is a support-specific material or not by using the setting information defined at the drop-down box 505 in FIG. 5A.

If a support-specific material is used, the management application 321 calculates the usage of the support-specific material output from a print head for the support by decrypting the control command, like the calculation of a usage of a general material. The management application 321 calculates the usage of the support-specific material as a non-object's usage.

On the other hand, if a material used for molding the object is also used for molding the support, the management application 321 may be required to identify a region output as the support from the control command 304 to calculate the usage of the material for the support. For example, because a support is characterized in that a material is output such that a plurality of thin pillar-shaped molded parts are aligned, the management application 321 may determine as a support a part in which an identical command group appears a predetermined number of time or more in the Z-axis direction. Alternatively, the management application 321 may determine as a support a part which is described as 3D model data in a molding part written in a control command generated by the molding control software 301.

Next, processing for calculating a non-object's usage caused by an aborted job as illustrated in FIG. 7C will be described. This processing is to be executed in S708.

In S731, the management application 321 identifies a command of the control command 304 at which the job has been aborted. A command at which the job has been aborted may be identified based on a log in the molding result 317, for example. Alternatively, a command at which the job has been aborted may be identified based on a job execution time. In order to identify it based on a job execution time, the management application 321 first acquires a job execution time from a job started time and a job aborted time and then decrypts the control command 304 to acquire the moving speed and stroke of the corresponding print head and thus calculates a required time for each command. The management application 321 then determines the command at a time when the total required time of commands and the job execution time are equal as the command at which the job has been aborted.

In S732, the management application 321 calculates a usage of the material used before the command identified in S731. The management application 321 calculates the usage of the material as a non-object's usage.

FIGS. 8A and 8C are flowcharts illustrating a flow of processing for totalizing usages, which may be implemented by execution of the management application 321.

With reference to FIG. 8A, processing will be described in which the usage history 326 is generated based on the usage counter information 325, which is executed every predetermined time period preset for the management application 321. This processing may be executed at a time point at 0:00 AM everyday in a case where the predetermined time period is one day, for example.

In S801 to S803, the management application 321 performs processing for each objective device for which the usage counter information 325 exists.

In S802, information described in the usage counter information 325 is recorded as the usage history 326.

In S803, if the process have completed on all objective devices, the management application 321 ends the processing of this flowchart.

FIG. 8B illustrates an example of the usage history 326. The usage history 326 corresponds to a red ABS resin in Device 1 in FIG. 8C.

The dates in FIG. 8B are dates when the usage counter information 325 is recorded. The usages correspond to the usage counter information 325 at the time points on the recorded dates. The management application 321 generates the usage history 326 for each type of material used in a device.

FIG. 8C is a flowchart illustrating a flow of processing for totalizing a usage of a material in a predetermined time period. For example, this processing is executed in a case where a user instructs to generate a report by designating a period for the totalization through a screen provided by the management application 321.

In S811 to S815, the management application 321 performs the totalizing processing on devices subject to the totalizing.

In S812, the usage history 326 in a predetermined time period for each device, which is recorded in S802 in FIG. 8A, is acquired. The management application 321 may acquire usage counter information only at the beginning and end of the predetermined time period or may acquire all historical records in the predetermined time period.

In S813, based on the usage history 326 acquired in S812, the usages of the material in the designated time for the totalizing are totalized. The totalizing processing is performed on usages of a material used for the molded object and non-object's usages used for execution of the job. The totalizing processing may be performed only for the usage of a material used for a molded object and for one non-object's usage. Alternatively, the totalizing processing may be performed for the usage of a material used for an object and a support and for the usage of a material used for at least one of an aborted job and preparation for molding.

Usages may be totalized only by calculating a difference in usage counter information at the beginning and end of a totalizing period, for example. However, in some cases, the usages at the beginning and end of the time period may not be calculated because the usage counter information cannot acquired at the beginning time and the end time of a designated time period or because such information does not exist, for example. In such cases, another totalizing method must be applied, but the totalizing method is not limited according to the present invention.

In S814, if the processing has completed on all devices subject to the totalizing, the management application 321 advances the processing to S815.

In S815, the management application 321 generates report data based on the calculated values. The management application 321 may only save the output data or may use the data to display the report.

Figure 9:
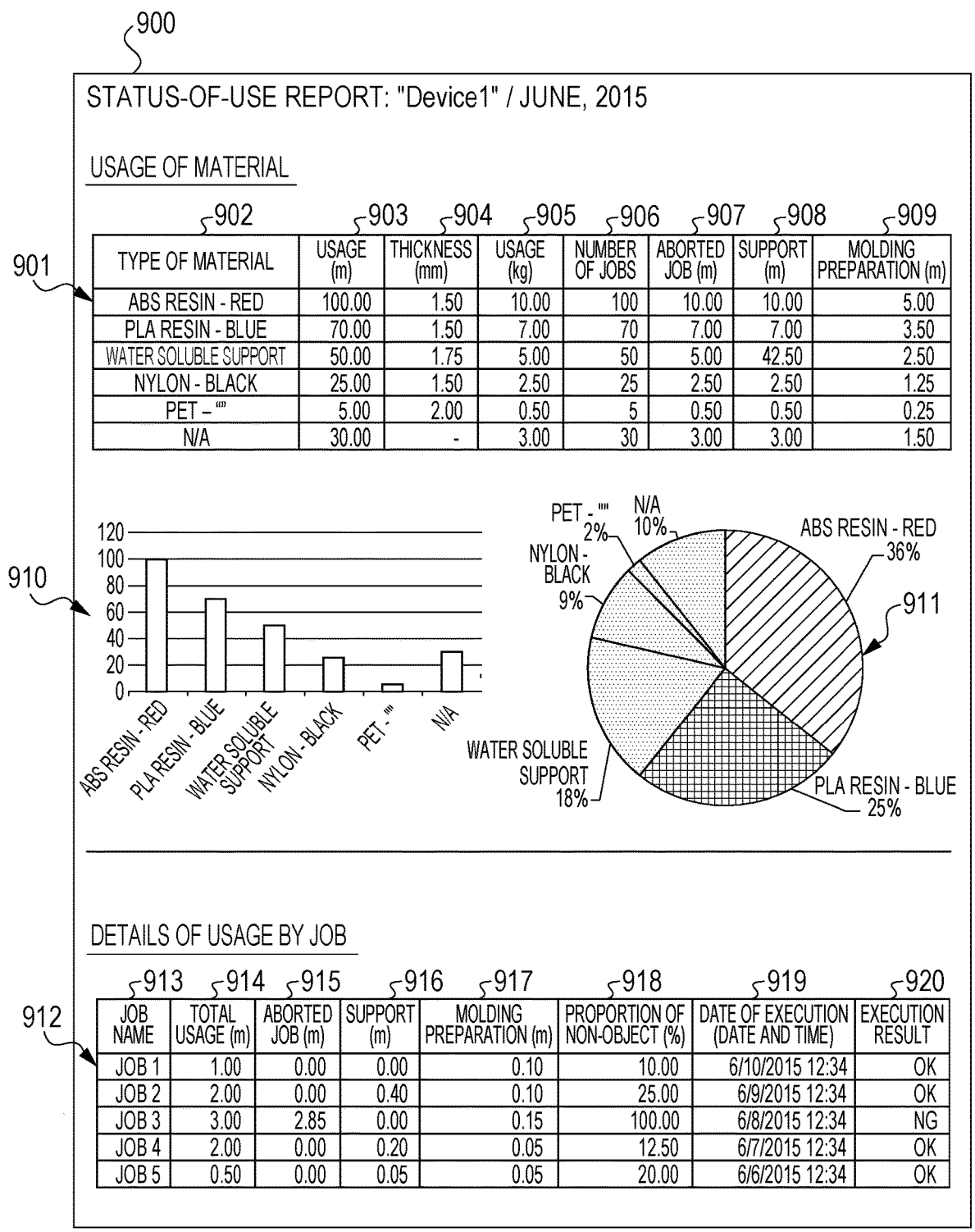
FIG. 9 illustrates an exemplary display screen showing a report.

FIG. 9 illustrates an exemplary display screen of a report generated by the processing in FIG. 8C. FIG. 9 illustrates a report 900 regarding statuses of use of materials subject to the totalizing by device. The report 900 may be presented in any manner such as a report in a Web application, a report in a native application, or a report printed on paper. Usages by type of material for each device, which are calculated by the processing in S811 to S814 in FIG. 8C, are displayed as a report as in the example illustrated in FIG. 9.

FIG. 9 illustrates a table 901 describing details of usages by type of material. A type of material 902 is an item describing a type of material used for a device subject to the report.

A usage 903 is an item describing a usage of a material in length (m) in a time period for totalizing. The usage of a material calculated by the processing in S811 to S814 in FIG. 8C is reflected to the usage 903.

A thickness 904 is an item describing a thickness (mm) of a material forming a shape of a filament. A usage 905 is an item describing a usage (kg) of a material in a time period for totalizing. The usage 905 is calculated by using the usage 903, the thickness 904, and the density of a material. For example, because the report 900 describes about a device using materials forming a shape of a filament, the usage 903 described in length, the thickness 904, and the density of each type of material are used to calculate the usage (kg). Alternatively, the usage 903 described in length and a cross section of the material may be used to calculate the usage (cubic metre).

A number of jobs 906 is an item describing the number of jobs executed by using the corresponding type of material. An aborted job 907 is an item describing a non-object's usage (m) when a job is aborted. A support 908 is an item describing a usage (m) of the material used for a support. A molding preparation 909 is an item describing a usage (m) of the material used for preparation for molding. A preset value may be used as a usage of a material used for one molding preparation.

FIG. 9 includes a graph 910 illustrating amounts of materials used by the device by material type. FIG. 9 further includes a graph 911 illustrating usage rates of materials used in the device.

A table 912 illustrates details of usages of materials by the device by job. The table 912 is generated by using historical records of usages of materials by job executed in the 3D printer, which are included in the usage history 326.

A job name 913 is an item representing a job name. A total usage 914 is an item representing a total amount of materials used (total usage of materials) (m) in a job. An aborted job 915 is an item representing a non-object's usage (m) of materials used in an aborted job. A support 916 is an item representing a non-object's usage (m) of a material specific to a model material support member or a support. A molding preparation 917 is an item representing a used amount (or usage) (m) of a material for molding preparation. A proportion of non-object 918 is an item describing a proportion (%) of a non-object's usage to a total usage. A date of execution 919 is an item representing date and time (mm/dd/yy, time) when the corresponding job has been executed. An execution result 920 is an item representing an execution result of a job. For example, if an execution result of a job is success, "OK" may be displayed. If not, "NG" may be displayed. The table 912 may further include an item representing one or more material types used for molding when the corresponding job is executed.

The tables and graphs in the report 900 are given for illustration purpose and for visualization of usages of materials, and data relating to other items than those in the report 900 may also be displayed. For example, the table 901 may further include items of the number of aborted jobs and the number of material replacement. Alternatively one of a usage used for an object and non-object's usage may be reported. As such a non-object's usage, one of usages for an aborted job, a support and a molding preparation may be reported. The table 912 illustrating details of usages of materials by job may present a totalization result of usages for a group of one or more material types used for a job.

According to this exemplary embodiment, usages of materials in a control device for a 3D printer, for example, can be grasped and be managed for each material type.

Second Exemplary Embodiment

According to the first exemplary embodiment, a 3D printer has been described which cannot acquire usage counter information and job history, unlike conventional 2D printers. Information including the control command 304, for example, is accumulated and is used as the job history 323 so that the usage counter information 325 can be generated for each material type and that a report relating usages of materials also in consideration of a non-object's usage may be presented.

According to this exemplary embodiment, the procedure may be simplified for a 3D printer which can acquire usage counter information and job history directly from a device, like a conventional 2D printer. More specifically, partial steps illustrated in the flowcharts in FIGS. 7A to 7C can be omitted. However, in a case where a job is aborted or an identical material is used for an object and a support, the calculation of a non-object's usage may require decrypting of a control command. This problem can be solved by performing the same steps as those of the first exemplary embodiment.

In a case where a total usage of materials for a job execution is available and where one of a usage of a material for an object and a non-object's usage is calculated from a control command, the totalizing processing may further include acquiring the other one by performing a subtraction.

Having mainly described a 3D printer which cannot acquire usage counter information and job history according to the first exemplary embodiment, the present invention is also applicable to a 3D printer which can acquire usage counter information and job history or environments in combination.

Third Exemplary Embodiment

According to the first and second exemplary embodiments, the usage counter information 325 is generated, and the usage history 326 is further generated to perform the totalizing processing. However, a report can be generated by performing the totalizing processing on all records of the job history 323 for each report generation without generating the usage counter information 325 and the usage history 326.

Thus, the present invention is also applicable to a configuration in which the management application 321 does not have the usage counter information 325 and the usage history 326 for the computer 104 illustrated in FIG. 3.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-190465, filed Sep. 28, 2015, which is hereby incorporated by reference herein in its entirety.

The invention claimed is:

1. A management server configured to manage information regarding at least a control device executing a job for molding a three-dimensional object by using a plurality of materials, the management server comprising:
one or more memories storing instructions; and
one or more processors which execute the instructions to:
collect information about one or more jobs executed by the control device, wherein the collected information of the one or more jobs includes identification of the control device having executed the one or more jobs, date information of the one or more jobs, information about a types of a plurality of materials used in the one or more jobs, and information about each amount of the plurality of materials used in the one or more jobs;
perform a totalizing process to totalize each amount of the plurality of materials used by the control device based on the collected information; and
provide a report regarding a result of the totalizing process,
wherein each amount of at least two materials of the plurality of materials used by the control device during a period for totalizing is displayed in the report, types of the at least two materials being different from each other, and wherein an amount of one of the two materials is displayed using a unit of volume in the report.

2. The management server according to claim 1, wherein, in the provided report, a first usage indicating an amount of a material used for molding the three-dimensional object corresponding to model data of the job and a second usage indicating an amount of a material used for other than the object for molding the three-dimensional object corresponding to the job are separately displayed.

3. The management server according to claim 2, wherein, in the provided report, the first usage for each job of the one or more jobs and the second usage for each job of the one or more jobs are separately displayed.

4. The management server according to claim 1, wherein, in the provided report, an amount of a material used for a support molded as required as a supporting member for molding the three-dimensional object corresponding to model data of the job is displayed.

5. The management server according to claim 1, wherein, in the provided report, an amount of a material used for the three-dimensional object molded halfway in a job aborted during a molding processing is displayed.

6. The management server according to claim 1, wherein, in the provided report, an amount of a material used for molding preparation is displayed.

7. The management server according to claim 1, wherein the management server manages a plurality of control devices and the totalizing process to totalize each amount of the plurality of materials used by the control devices is performed.

8. The management server according to claim 1, wherein, in the provided report, a number of aborted jobs is displayed.

9. The management server according to claim 1, wherein the two materials are powder and a sub material for molding the three-dimensional object using the powder.

10. The management server according to claim 1, wherein the date information includes at least one of start date information and completion date information.

11. The management server according to claim 1, wherein the control device is a 3D printer.

12. A control method for a management server configured to manage information regarding at least a control device executing a job for molding a three-dimensional object by using a plurality of materials, the control method comprising:
    collecting information about one or more jobs executed by the control device, wherein the collected information of the one or more jobs includes identification of the control device having executed the job one or more jobs, date information of the one or more jobs, information about a types of a plurality of materials used in the one or more jobs, and information about each amount of the plurality of materials used in the one or more jobs;
    performing a totalizing process to totalize each amount of the plurality of materials used by the control device based on the collected information; and
    providing a report regarding a result of the totalizing process,
    wherein each amount of at least two materials of the plurality of materials used by the control device during a period for totalizing is displayed in the report, the types of the at least two materials being different from each other, and wherein an amount of one of the two materials is displayed using a unit of volume in the report.

13. The control method according to claim 12, wherein, in the provided report, a first usage indicating an amount of a material used for molding the three-dimensional object corresponding to model data of the job and a second usage indicating an amount of a material used for other than the object for molding the three-dimensional object corresponding to the job are separately displayed.

14. The control method according to claim 12, wherein, in the provided report, an amount of a material used for a support molded as required as a supporting member for molding the three-dimensional object corresponding to model data of the job is displayed.

15. The management server according to claim 12, wherein, in the provided report, a number of aborted jobs is displayed.

16. The management server according to claim 12, wherein the two materials are powder and a sub material for molding the three-dimensional object using the powder.

17. The management server according to claim 12, wherein the date information includes at least one of start date information and completion date information.

18. The management server according to claim 12, wherein the control device is a 3D printer.

19. A non-transitory computer readable storage medium on which is stored a computer program for making a computer execute a control method for a management server configured to manage information regarding at least a control device executing a job for molding a three-dimensional object by using a plurality of materials, the control method comprising:
    collecting information about one or more jobs executed by the control device, wherein the collected information of the one or more jobs includes identification of the control device having executed the one or more jobs, date information of the one or more jobs, information about a types of a plurality of materials used in the one or more jobs, and information about each amount of the plurality of materials used in the one or more jobs;
    performing a totalizing process to totalize each amount of the plurality of materials used by the control device based on the collected information; and
    provide a report regarding a result of the totalizing process,
    wherein each amount of at least two materials of the plurality of materials used by the control device during a period for totalizing is displayed in the report, types of the at least two materials being different from each other, and
    wherein an amount of one of the two materials is displayed using a unit of volume in the report.

20. The management server according to claim 19, wherein, in the provided report, a number of aborted jobs is displayed.

21. The management server according to claim 19, wherein the two materials are powder and a sub material for molding the three-dimensional object using the powder.

22. The management server according to claim 19, wherein the date information includes at least one of start date information and completion date information.

23. The management server according to claim 19, wherein the control device is a 3D printer.

* * * * *